United States Patent [19]
Wyslotsky

[11] Patent Number: 5,546,731
[45] Date of Patent: Aug. 20, 1996

[54] METHOD OF EXTENDING SHELF LIFE OF A COMESTIBLE PRODUCT WHILE PROVIDING A LOCALLY PACKAGED APPEARANCE

[75] Inventor: Ihor Wyslotsky, 5050 Newport Dr. Section 7, Rolling Meadows, Ill. 60008

[73] Assignee: Ihor Wyslotsky, Rolling Meadows, Ill.

[21] Appl. No.: 87,602

[22] Filed: Jul. 2, 1993

[51] Int. Cl.⁶ .............................. B65B 31/00; B65B 55/00
[52] U.S. Cl. .................................. 53/400; 53/432; 53/434; 206/524.8; 426/111
[58] Field of Search ............................ 53/400, 432, 405, 53/403, 433, 510, 511, 425, 453, 434; 206/524.8; 426/111

[56] References Cited

U.S. PATENT DOCUMENTS

| | | | |
|---|---|---|---|
| 3,492,773 | 2/1970 | Bergstrom | 53/433 |
| 3,709,702 | 1/1973 | Mahaffy et al. | 206/524.8 X |
| 3,957,097 | 5/1976 | Swett | 206/524.8 X |
| 4,098,404 | 7/1978 | Markert | 206/524.8 X |
| 4,125,632 | 11/1978 | Vosti et al. | 206/524.8 X |
| 4,381,061 | 4/1983 | Cerny et al. | 426/111 X |
| 4,466,553 | 8/1984 | Zenger | 206/524.8 X |
| 4,796,411 | 1/1989 | Kimura et al. | 53/453 |
| 4,880,129 | 11/1989 | McHenry et al. | 426/111 X |
| 4,899,517 | 2/1990 | Shima et al. | 53/432 |
| 4,964,507 | 10/1990 | Chen | 426/111 X |

Primary Examiner—James F. Coan
Attorney, Agent, or Firm—Hill, Steadman & Simpson

[57] ABSTRACT

The present invention is directed to packaging methods for preserving a comestible, and for extending the shelf-life thereof, while simultaneously providing a freshly baked and locally packaged appearance. The package includes a retractable panel located at an inconspicuous place on the package which panel is pressed inwardly by atmospheric pressure, after the essentially inert modified atmosphere within the package has been partially absorbed by the comestible contained there within.

15 Claims, 1 Drawing Sheet

METHOD OF EXTENDING SHELF LIFE OF A COMESTIBLE PRODUCT WHILE PROVIDING A LOCALLY PACKAGED APPEARANCE invention relates generally to packaging methods for comestible products, and more particularly to methods of preserving a comestible product, such as for example bakery products, and extending the shelf-life thereof, while simultaneously providing a freshly baked and locally packaged appearance.

In the prior art, consumers have shown a preference for muffins, croissants, and other freshly baked bakery goods, such as may be typically provided at a large grocery supermarket which has a bakery on the premises. Packaging provided for such bakery goods is often in the form of clear plastic clam-shell packaging of the kind having reclosable respective flanges around both the lid portion and the bottom portion for non-sealed, but lockable engagement thereof.

In direct contrast to such freshly baked goods contained within such a non-sealed and locally packaged receptacle are baked goods which are contained in certain other forms of packaging clearly indicating to the consumer that the bakery for producing this product is not located on the premises of the point of sale grocery store. Specifically, the consumer, who is typically a sophisticated shopper, readily knows the difference between local packaging, and packaging for goods produced off the premises. For example, packaging for bakery goods which are produced off the premises may include sealed packages of various kinds, and especially sealed cardboard packages, with or without a clear film-covered window, and other forms of permanently sealed packages well known to consumers.

For reasons of consumer marketing psychology and product appeal, it has been determined by those skilled in the bakery goods marketing arts that consumers prefer the appearance and ambiance of bakery products which have a freshly baked, and hence locally packaged, appearance.

Accordingly, and in view of the defects and deficiencies of the prior art, it is a material object of the methods of the present invention to provide functioning of packaging which, while preserving the comestible product including bakery goods and extending the shelf-life thereof, will also provide a freshly baked and locally packaged appearance.

It is a further object of the methods of the present invention to provide specialized modified atmosphere packaging, thereby to extend the shelf-life of the comestible including bakery products contained therein.

It is a yet further object of the methods of the present invention to provide packaging which will include the packaging features necessary to accommodate a modified atmosphere therein, while simultaneously providing a freshly baked and locally packaging appearance.

SUMMARY OF THE INVENTION

The methods of preserving a comestible product, and extending shelf life thereof, while providing a freshly baked and locally packaged appearance of the present invention include the steps wherein a package bottom is provided having at least one retractable, inwardly disposable panel thereon. A comestible product is then inserted into the package bottom. Next, a package lid is provided for the package bottom. A substantially inert atmosphere or other modified atmosphere gas is injected into the package bottom which has been covered by the package lid to constitute a covered package. Whereupon, the comestible contents of the package absorb at least a portion of the inert gaseous atmosphere to lower the partial pressure within the covered package, and thereby to cause an inwardly disposable panel on the package bottom to retract inwardly.

Such inwardly disposable panel is necessarily located on an inconspicuous portion of the package, such as on the bottom surface of the package in some preferred embodiments. Also in preferred embodiments, the package lid has no panel thereon which would be susceptible to inward retraction, whereby the consumer sees no retraction of a panel located on the package lid. Accordingly, the package functions to provide to the appearance that the comestible product has been made and packaged locally.

BRIEF DESCRIPTION OF THE DRAWING

In the accompanying drawing, wherein common numerals are utilized for common elements, the presently inventive methods of preserving a comestible product and extending the shelf-life thereof while providing the freshly baked and locally packaged appearance are depicted, and wherein.

Figure 1:
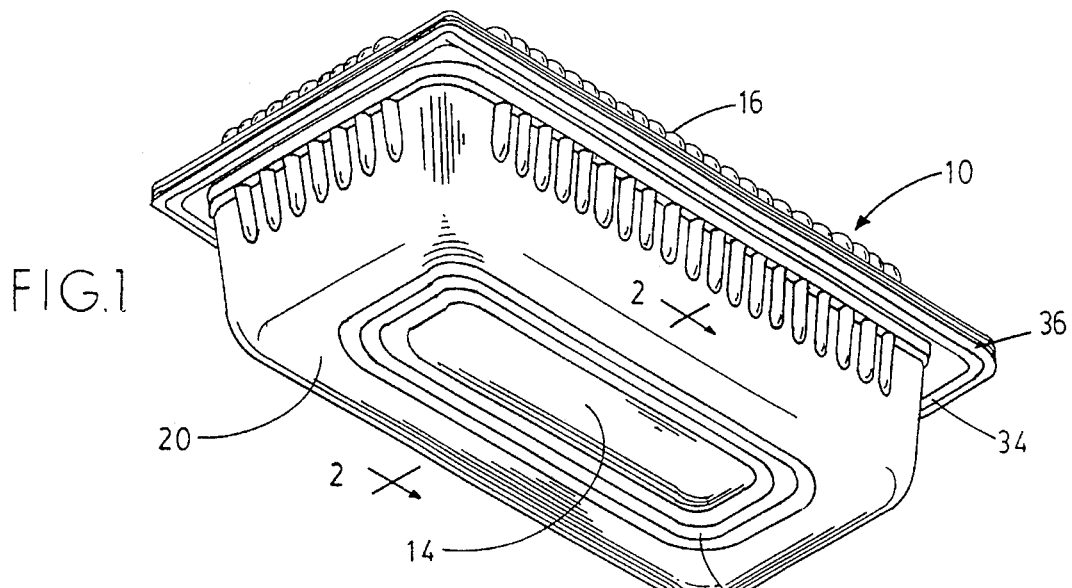
FIG. 1 is a perspective view of a modified atmosphere package having a package bottom and a package lid, each of which has a sealing flange thereon for overlapping and sealing disposition therebetween, and setting forth the retractable bottom panel thereof.

The improved methods of the present invention may be better understood with regard to the following detailed description of preferred embodiments.

DETAILED DESCRIPTION OF PREFERRED EMBODIMENTS

The methods of the present invention of preserving a comestible product and extending shelf-life thereof while providing a freshly baked and locally packaged appearance include, inter alia, steps wherein a package bottom is provided having at least one retractable inwardly disposable panel thereon. A comestible product is then inserted into the package bottom. Next, a package lid is provided for disposition upon the package bottom. Such package bottom and lid may be attached as in, for instance, a clam-shell package. Such package may preferably be formed of a clear film, and also preferably formed from atmosphere excluding barrier material.

A substantially inert atmosphere or other modified atmosphere gas is injected into the now covered package. Whereupon, the comestible contents of the package absorb at least a portion of the inert gaseous atmosphere to lower the partial gaseous pressure within the covered package, and thereby to cause the inwardly disposable panel on the package bottom to retract inwardly.

Such inwardly disposable panel is located in an inconspicuous position, and preferably on the bottom surface of the package. Also in preferred embodiments, the package lid has no panel or other portion thereon which is susceptible to inward retraction, whereby the consumer would thus observe no retraction of any of the panels comprising the package lid or other distortion, and accordingly the package is provided with the appearance that the comestibles contained therein have been made and packaged locally.

The inert atmosphere may comprise carbon dioxide, oxygen, or other substantially oxygen-free gas which is not destructive to the comestible contents of the package.

Upon completion of the steps of (a) insertion of the food into the package, (b) infusion of the inert atmosphere thereof, (c) sealing of the package and finally (d) absorption of the inert atmosphere into the comestible, the retractable panel on the panel bottom is drawn inwardly thereinto. Specifically, the package bottom is formed of walls, and the retractable and inwardly disposable panel on the package bottom is surrounding by corrugations, in preferred embodiments, which are formed unitarily with the walls of the package bottom. Likewise, the package lid is substantially non-deformable under the inward pressure of the ambient atmosphere caused by absorption of a portion of the inert gaseous atmosphere into the comestible. This process results in the package lid of the sealed package continuing to appear undeformed and thus to appear as if the contents thereof have been baked locally, and to the extent possible to give the appearance of a non-modified atmosphere package.

Respective sealing flanges are provided on the package bottom and the package lid. The respective sealing flanges are then sealed together. The sealing flanges may be sealed together by abutting the respective sealing flanges into overlapping relationship, and then forming a seal line, for example, by application of heat ultrasonic energy or by other means known to those skilled in the art, along such seal line into the overlapped sealing flanges. At least one of the respective sealing flanges may be provided with a peel flap in preferred embodiments for directing a peel force along the seal line in order to remove the sealed package lid from the sealed package body.

Referring now to the drawing, wherein a package generally 10 for carrying out the methods of the present invention is st forth.

Specifically, and as set forth, supra, the methods of the present invention of preserving a comestible and extending shelf-life thereof while providing a freshly baked and locally packaged appearance include steps wherein a package bottom 12 is provided having at least one retractable inwardly disposable panel 14 thereon. A comestible product is then inserted the package bottom 12. Next, a package lid 16 is provided for disposition upon package bottom 12. Such package bottom 12 and lid 16 may be attached as in, for instance, a clam-shell package of the type depicted in FIGS. 1, 2 and 3 hereof.

Figure 2:
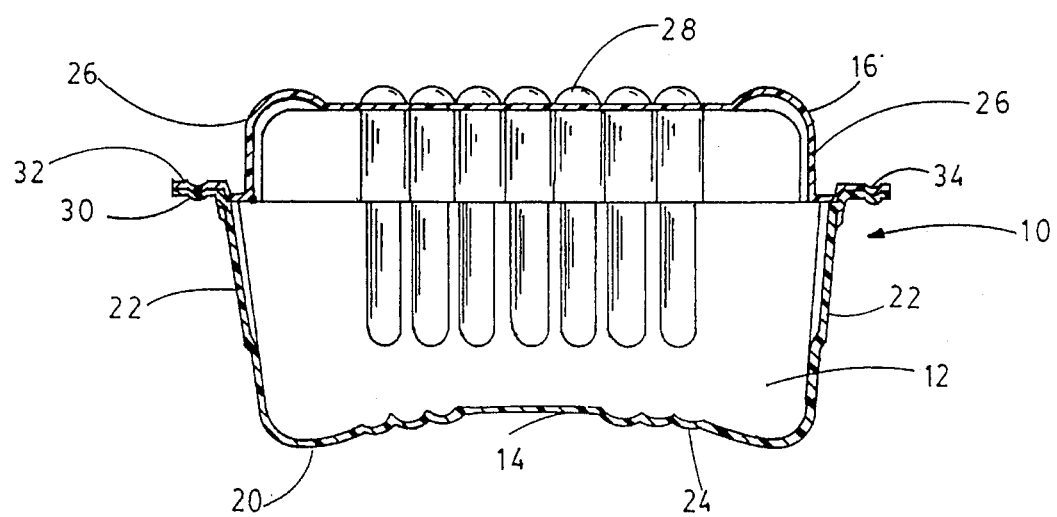
FIG. 2 is a slightly enlarged cross sectional view taken along line 2—2 of FIG. 1 and showing the side walls including the reinforced side wall of the packaged lid and the packaged bottom, 15 and depicting the package bottom panel in retracted disposition.
Figure 3:
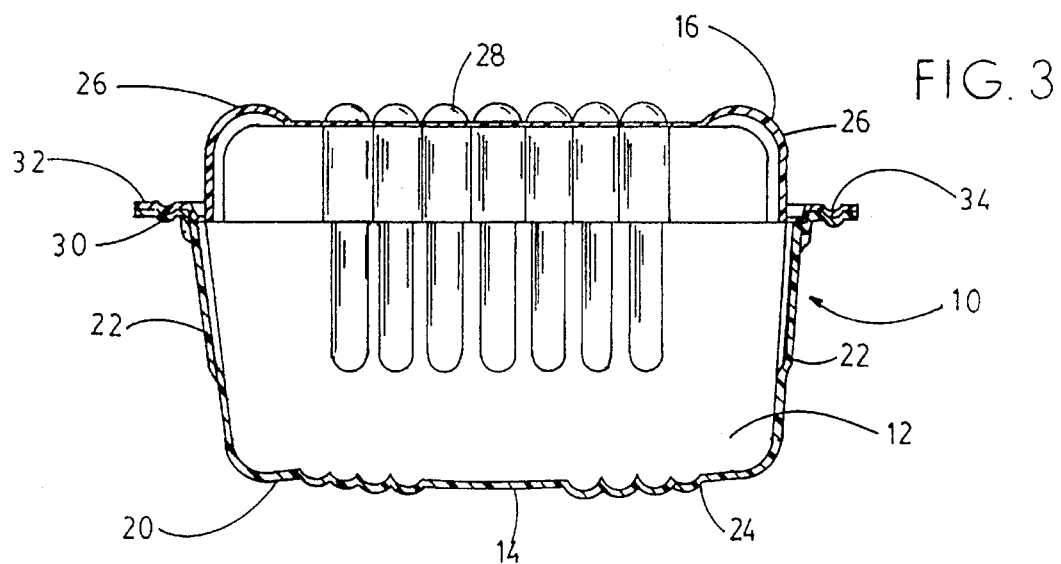
FIG. 3 is a slightly enlarged side view corresponding to that of FIG. 2 and showing the retractable bottom panel in non-retracted configuration.

A substantially inert atmosphere or other modified atmosphere gas is to be injected into the now covered package 10, such as is shown in FIG. 3. Whereupon, and as shown in FIG. 2, the comestible contents of package 10 absorb at least a portion of the inert gaseous atmosphere to lower the partial pressure within the covered package 10 and thereby to cause the inwardly disposable panel 14 on package bottom 12 to retract inwardly, as shown in FIGS. 1 and 2.

Such inwardly disposable panel 14 is located on the bottom surface 20 of package 10. Package lid 16 has no panel thereon which is susceptible to inward retraction. Package bottom 12 is formed of side walls 22,22 and bottom surface 20. As shown in FIGS. 1, 2 and 3, retractable and inwardly disposable panel 14 on package bottom 12 is surrounding by corrugations 24, in preferred embodiments, which are formed unitarily with bottom surface 20 of package bottom 12. Likewise, package lid 16 is substantially non-deformable under the inward pressure of the ambient atmosphere caused by absorption of a portion of the inert gaseous atmosphere into the comestible. Package lid 16 includes side wall 26,26, and package lid reinforcing means unitarily formed into side walls 26,26 thereof, in the form of corrugations 28 molded into side walls 26,26 to provide structural strength thereto.

Respective sealing flanges 30,32 are provided on package bottom 12 and package lid 16. Respective sealing flanges 30,32 are then sealed together as t seal 34. Sealing flanges 30,32 may be sealed together by abutting respective sealing flanges 30,32 into overlapping relationship, and then embossing a seal line 34, such as by application of heat along such seal line 34 into the overlapped sealing flanges. At least one of the respective sealing flanges 30,32 may be provided with suitable opening means such as a peel flap 36 as shown in FIG. 1 for directing a peel force along the seal line 34 in order to remove sealed package lid 16 from sealed package body 12.

The basic and novel characteristics of the improved methods and apparatus of the present invention will be readily understood from the foregoing disclosure by those skilled in the art. It will become readily apparent that various changes and modifications may be made in the form, construction and arrangement of the improved apparatus of the present invention, and in the steps of the inventive methods hereof, which various respective inventions are as set forth hereinabove without departing from the spirit and scope of such inventions. Accordingly, the preferred and alternative embodiments of the present invention set forth hereinabove are not intended to limit such spirit and scope in any way.

What is claimed is:

1. A method of preserving a comestible product and extending the shelf-life thereof while providing a freshly baked and locally packaged appearance, said method comprising the steps of:

providing a package bottom having at least one retractable inwardly disposable panel thereon;

inserting the comestible product thereinto;

providing a package lid for the package bottom;

covering the package bottom with the package lid;

injecting a substantially inert atmosphere which is absorbable at least in part by the comestible product been inserted into the covered package bottom;

absorbing at least a portion of the inert gaseous atmosphere into the comestible product to lower the partial gaseous pressure within the covered package, and thereby to cause the inwardly disposable panel on the package bottom to retract inwardly; and wherein the package lid has no panel thereon susceptible to inward retraction, whereby the consumer sees no retraction of a panel in viewing the package lid from above, and thus may conclude that the comestible has been made and packaged locally.

2. The method of claim 1 wherein the retractable, inwardly disposable panel is located on the bottom surface of the package bottom.

3. The method of claim 1 wherein the package bottom further includes side walls and a package reenforcing means unitarily formed into the side walls thereof.

4. The method of claim 1 wherein the comestible product comprises bakery goods.

5. The method of claim 1 wherein the inert atmosphere comprises carbon dioxide.

6. The method of claim 1 wherein the inert atmosphere comprises nitrogen.

7. The method of claim 1 wherein the inert atmosphere is substantially oxygen-free.

8. The method of claim 1 wherein, upon insertion of the comestible product into the package and upon infusion of the inert atmosphere thereof, sealing of such package and absorption of the inert atmosphere into the comestible product, the retractable panel on the package bottom is drawn inwardly thereunto.

9. The method of claim 1 wherein the package bottom is formed of walls and the retractable, inwardly disposable panel on the package bottom is surrounded by corrugations formed unitarily with the walls of the package bottom.

10. The method of claim 1 wherein the package lid is substantially non-deformable under the inward pressure caused by absorption of the inert atmosphere into the comestible product, whereby the package lid of the sealed package continues to appear undeformed and thus to appear as a non-modified atmosphere package, and accordingly as if baked locally.

11. The method of claim 1 where the package lid includes side walls, and the package lid re-enforcing means are unitarily formed into the side walls thereof.

12. A method of preserving a comestible product and extending the shelf-life thereof while providing a freshly baked and locally packaged appearance, said method comprising the steps of:

providing a package bottom having at least one retractable inwardly disposable panel thereon;

inserting the comestible product thereinto;

providing a package lid for the package bottom;

covering the package bottom with the package lid;

injecting a substantially inert atmosphere which is absorbable at least in part by the comestible product into the covered package bottom;

providing respective sealing flanges on the package bottom and on the package lid, and sealing the respective sealing flanges together by abutting into overlapping relationship the respective sealing flanges, and forming a seal line there along into the overlapped sealing flanges; and absorbing at least a portion of the inert gaseous atmosphere into the comestible product to lower the partial gaseous pressure within the covered package, and thereby to cause the inwardly disposable panel on the package bottom to retract inwardly.

13. The method of claim 12 further comprising the step of providing at least one of the respective sealing flanges with a peel flap for directing a peel force along the seal line in order to remove the sealed package lid from the sealed package body.

14. The method of claim 12 wherein the seal line is formed by means of the application of heat.

15. The method of claim 12 wherein the seal line is embossed into the respective sealing flanges.

\* \* \* \* \*